Sept. 19, 1972     K. LAUER ET AL     3,692,579

PROCESS AND APPARATUS FOR THE CONTINUOUS PRODUCTION OF SOLUTIONS

Filed Jan. 15, 1970     2 Sheets-Sheet 1

INVENTOR.
KARL LAUER
PETER STEPHAN
BY Burgess, Dinklage & Sprung
ATTORNEYS

United States Patent Office 3,692,579
Patented Sept. 19, 1972

3,692,579
PROCESS AND APPARATUS FOR THE CONTINUOUS PRODUCTION OF SOLUTIONS
Karl Lauer, Strahlenburg, Schriesheim, Germany, and Peter Stephan, Romerstrasse 52, Worms am Rhine, Germany
Filed Jan. 15, 1970, Ser. No. 3,166
Claims priority, application Germany, Jan. 22, 1969,
P 19 03 027.4
Int. Cl. B01f 1/00
U.S. Cl. 127—22
20 Claims

ABSTRACT OF THE DISCLOSURE

Solutions of readily soluble material, e.g. sugar, having any desired solute concentration are produced continuously on a large scale by introducing measured amounts of a solid solute into a downwardly moving current of solvent wherein a constricted passage for the solvent is provided to accelerate solvent flow, the constricted passage being closed by a sieve, and the product solution is withdrawn through the sieve.

---

The present invention is concerned with a process and a device for the continuous preparation on a large scale of solutions of defined concentration, from solid material and solvent.

The preparation of comparatively large amounts of solutions, including concentrated solutions, from solid materials and solvents is a unit operation which is frequently necessary in chemical technology, for example, in industries working with mineral salts or sugars, and one that has to be carried out with considerable expenditures of time, energy and/or labor. A variety of devices are used for this purpose, some of which work continuously but most of which operate discontinuously. A description of most of the conventional devices is to be found, for example, in A. J. Kieser (Handbuch der Chem.-Techn. Apparate, Maschinellen Hilfsmittel und Werkstoffe, published by Springer Verlag, Berlin, 1939, p. 1020 et seq.) and in P. Freund (Zeitschrift für die Zuckerindustrie, 1962, No. 10, p. 554 et seq.).

Continuously operating devices, such as screw troughs, lifting shovel troughs, flow tubes and cascade stirrer troughs, necessitate little supervision by personnel but are very expensive from the point of view of apparatus and energy requirements. On the other hand, more simply constructed, discontinuously operating devices, such as stirrer vessels or percolators, necessitate a lesser expenditure for machinery but a greater degree of supervision and servicing.

We have now found, surprisingly, that, in accordance with this invention, the above disadvantages can be avoided and it is possible to continuously obtain a solution of defined concentration and in large quantities from a readily soluble solid material and a solvent while at the same time increasing the dissolving capacity per unit volume of the apparatus used.

The invention essentially comprises introducing measured amounts of finely divided solid material continuously into a current of solvent which is slowly moving downwardly in a vertical chamber at a definite rate of flow and then taking off the solution thus obtained, which may still contain solid material, continuously at an increased flow velocity, through at least one passage closed by a sieve.

In a preferred embodiment of the process according to the present invention, the solvent current is passed through a vertical tube which is conically tapered downwardly at the bottom thereof to provide a passage through which increased flow velocity is achieved, the narrow (bottom) end of such conically tapered portion being closed by a sieve which is corrosion-resistant to the solid material and to the solvent. Through this sieve, the solution is pumped off in an amount corresponding to that in which the solvent and solid material are supplied to the top of the tube. Small particles of solid material dissolve during the slow descent through the solution in the tube, whereas any larger particles are retained by the sieve but are quickly dissolved in the stronger and faster solution current in the constricted portion of the vertical tube.

The tube length and the pumping velocity are such that the solvent requires 0.5–20 minutes, preferably 1–10 minutes, to run through. In the specific case of producing an aqueous sugar solution of 50–65° Brix, good results are obtained with a flowthrough time of 0.5–10 minutes at a temperature of 70–80° C.

In order to ensure defined concentrations in the final solution, the addition of solid material can be controlled, via automatic regulating devices, by means of a concentration measurement or monitoring cell in the run-off. Similarly, the inflow of solvent can be controlled, via suitable regulation devices, by the flow velocity or the liquid level in the tube. Furthermore, if necessary, the solubility of the solid material can be increased by the thermostatic control of the solvent and the solution at the same temperature or at a different temperature.

The process according to the present invention can, of course, be used for all manner of readily soluble solid materials and solvents but particularly good results have been obtained when sucrose is used as the solid material and water or an aqueous solution of sugar is used as solvent.

An apparatus according to the present invention for the continuous, large-scale production of solutions of defined concentration from readily soluble solid material and a solvent comprises a vertical tube adapted to be filled with solvent, inlets at the top of the tube for the solvent and solid material, a run-off at the bottom of the tube for the final solution and devices for the measurement and control of the solvent, solid material and solution, the tube being provided with at least one, preferably conical, constriction which is closed by a sieve.

As solid supplying means, there can be used, for example, an oscillating device or a screw conveyor, the carrying through-put of which is controlled by a concentration measurement cell in the run-off from the tube.

The solvent supply and the run-off from the tube can be controlled by variable pumps or valves, the solvent supply pump being conveniently controlled by the flow velocity in the tube or by the liquid level in the tube.

It is also desirable for the solvent inlet and the tube to be thermostatically controlled either separately or together.

According to another preferred feature of the device of the present invention, the sieve is exchangeably connected with the tube, for example, by means of a suitable flange.

Several embodiments of the device according to the present invention are illustrated in the accompanying drawings, in which.

Figure 1:
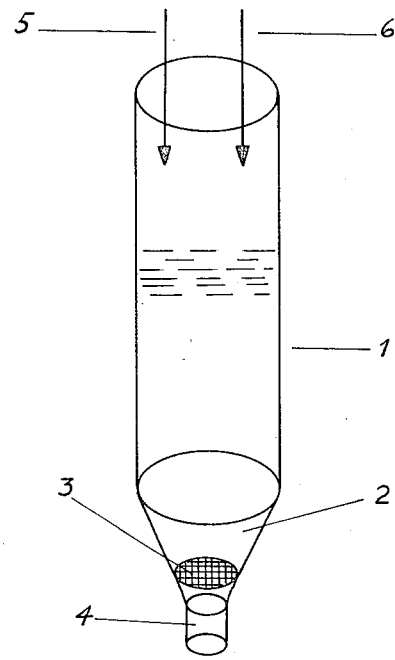
FIG. 1 is a schematic illustration of a dissolving apparatus.

A simple embodiment of the apparatus according to the present invention, which is illustrated in FIG. 1, comprises a dissolving tube 1 with a conical constriction 2 containing a sieve 3, a solution run-off 4, a solvent inlet 5 and a solid material inlet 6.

Figure 2:
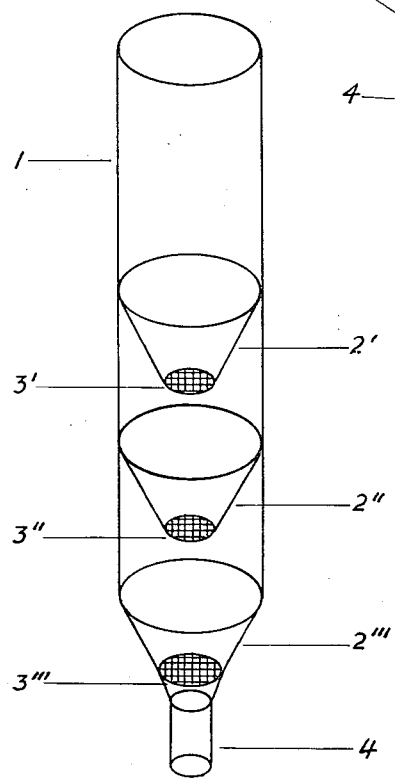
FIG. 2 is a schematic illustration of one type of multi-stage dissolving apparatus.
Figure 3:
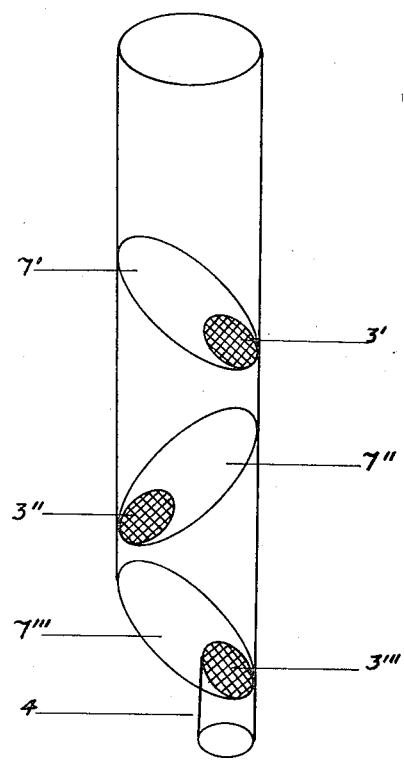
FIG. 3 is a schematic illustration of another type of multi-stage dissolving apparatus.

FIG. 2 shows a combination of three conical constrictions, analogous to that of FIG. 1, to result in an advantageous multi-stage apparatus and FIG. 3 shows a multi-stage apparatus in which the constriction is achieved by elliptical plates 7. The plates can also be removably mounted in order to simplify the cleaning of the sieve parts 3.

Figure 4:
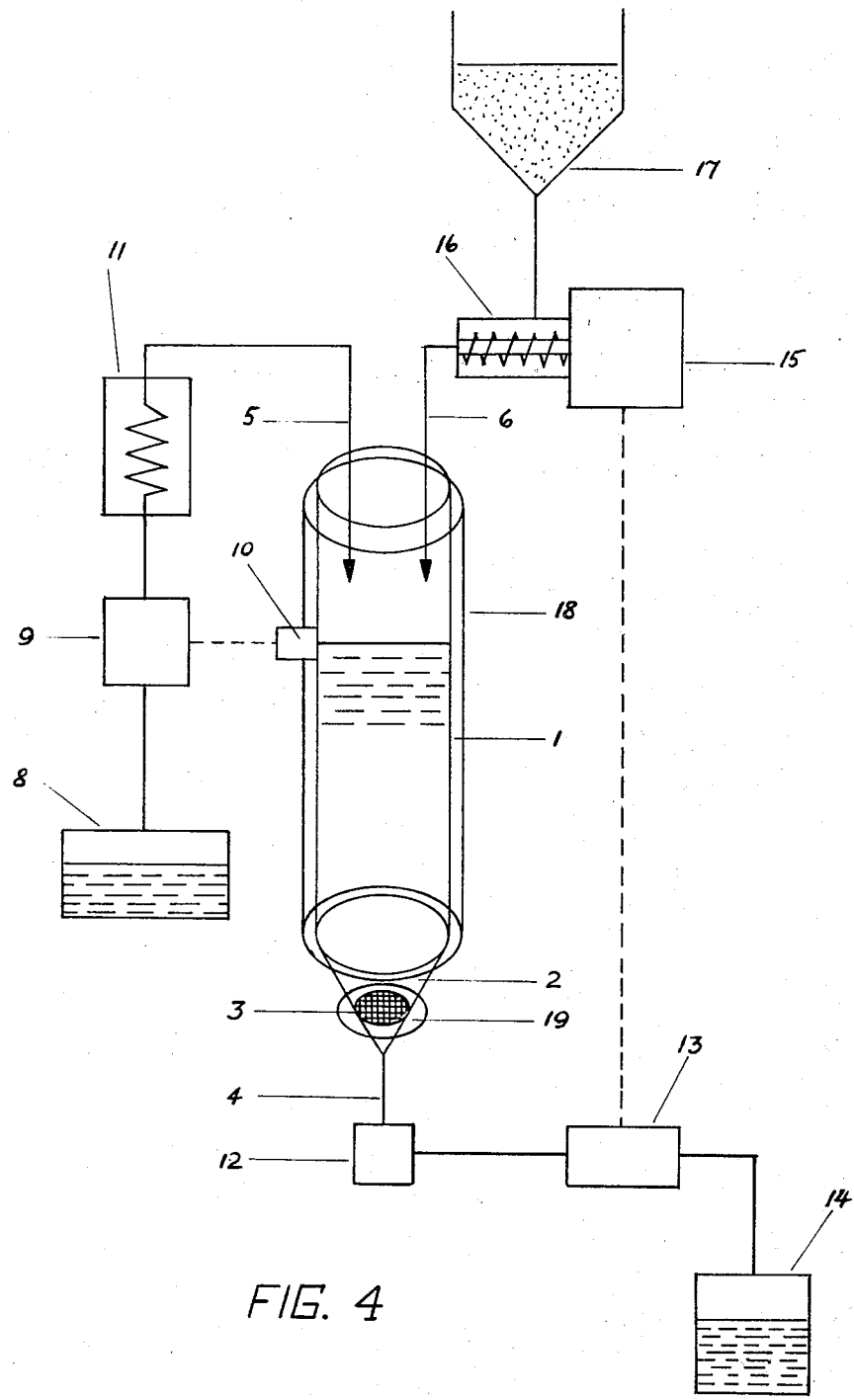
FIG. 4 is a schematic flow-sheet illustration of a typical measurement and control arrangement for carrying out the process of the present invention automatically.

In FIG. 4, there is schematically illustrated a typical measurement and regulation arrangement, together with a device according to the present invention. From a solvent reservoir 8 solvent is pumped by a pump 9, which is controlled by a level measurer 10, through a thermostatic control means 11 to solvent inlet tube 5 and then into the dissolving tube 1. Pump 12 pumps the final solution out from the run-off pipe 4, through a concentration measurement cell 13 and into a storage tank 14. The concentration measurement cell 13 controls drive 15 of a conveyor worm 16 which conveys solid metal from a storage container 17 through the inlet 6 into the dissolving tube 1. This regulation permits solutions of various degrees of dilution, the concentrations of which are to be increased, to be employed instead of pure solvent in the process of this invention. The sieve part 3 is, in this case, constructed as a separate, flanged-on sieve plate 19 so that this part of the apparatus can be cleaned or changed especially easily. The dimensions of the dissolving tube 1 are the limiting factor for the throughput. By variation of the size of the mesh in the sieve, as well as of the flow-through velocity, the temperature, the amount of solid material added and also the selected filling height in the tube 1, the process can be adapted to the prevailing requirements and to the physical characteristics of the solid material, as well as of the solvent.

The following examples are given for the purpose of illustrating the present invention:

EXAMPLE 1

Into a 100 cm. long dissolving tube with a diameter of 10 cm., a sieve surface area of 79 cm.$^2$, a sieve mesh size of 0.1 cm., the height of liquid in the tube being 80 cm., there were introduced into the top thereof, per hour, 50 kg. of sucrose and 50 kg. water at a temperature of 80° C. With an average residence time of 6 minutes, from the bottom of the tube there were withdrawn, per hour, 100 kg. or 80 liters of sugar solution of 50° Brix. This amount corresponds to a through-put of 72 metric tons per month or a vessel volume capacity of 12.5 metric tons per cubic meter per hour. Previously used devices were capable of achieving, maximally, through-put values of about 4 to 6 metric tons per cubic meter per hour.

The control of the supply of sugar was carried out by means of a controllable screw conveyor, which in turn was controlled by the measured voltage of a flow-through refractograph. The liquid level in the dissolving tube was kept constant by a floating valve. The take-off of the solution was carried out by means of a dosing pump.

EXAMPLE 2

In an apparatus according to Example 1, but with a height of liquid in the dissolving tube of 20 cm., there were introduced, per hour, 35 kg. of water at a temperature of 80° C. and 65 kg. of sucrose. After a residence time of 0.8 minutes, there were withdrawn, per hour, 100 kg. or 75 liters of a sucrose solution of 64° Brix. This value corresponds to 73 metric tons per month or 50 metric tons per cubic meter per hour, which is ten times the capacity of conventional devices.

EXAMPLE 3

Into a 200 cm. long dissolving tube having a diameter of 40 cm., with a conical constriction according to FIGS. 1 and 4, a sieve surface area of 177 cm.$^2$ and a mesh size of 0.1 cm., there were introduced, per hour, 1200 kg. of water and 1200 kg. of sucrose. The height of liquid in the dissolving tube was 120 cm. and the temperature thereof was 70° C. There were obtained, per hour, 2400 kg. or 1950 liters of sugar solution of 50° Brix, which corresponds to 1730 metric tons per month or 16 metric tons per cubic meter per hour.

EXAMPLE 4

In an apparatus according to Example 1, there were mixed, per hour, 30 kg. of water at 30° C. and 9 kg. of sodium chloride. The height of liquid in the dissolving tube was 85 cm. and average residence time of solution in the apparatus was 10 minutes. There were obtained 39 kg. per hour of a 23% solution of sodium chloride, which corresponds to 28 metric tons per month or 5.8 metric tons per cubic meter per hour.

EXAMPLE 5

In an apparatus according to Example 1, there were mixed, per hour, 30 kg. of water at 30° C. and 15 kg. of anhydrous sodium sulphate. The height of liquid in the dissolving tube was 85 cm. There were obtained 45 kg. per hour of a 33% solution of sodium sulphate, which corresponds to 53 metric tons per month or 5.6 metric tons per cubic meter per hour.

What is claimed is:

1. Process for the continuous production of solutions of defined concentrations from a readily soluble solid material, which process comprises continuously introducing measured amounts of a finely divided solid material into a current of a solvent which is slowly moving downwardly in a vertical chamber at a defined rate of flow and taking off the solution thus obtained, which may still contain solid material, continuously, at an increased flow velocity relative to that at the top of the chamber, through at least one passage closed by a sieve.

2. Process as claimed in claim 1 wherein the solid material feed rate is controlled by measurement of the concentration of the solution taken off and using the resulting signals to regulate the feed rate of solid material.

3. Process as claimed in claim 1 wherein the solvent and the solution are thermostatically maintained at the same temperature.

4. Process as claimed in claim 1 wherein the solvent is thermostatically maintained at one temperature and the solution is thermostatically maintained at a different temperature.

5. Process as claimed in claim 1 wherein the solid material is sucrose and the solvent is water or an aqueous relatively dilute sugar solution.

6. Process as claimed in claim 5 wherein a temperature of 70 to 80° C. is maintained in the liquid in the vertical chamber and a flow-through residence time of 0.5 to 10 minutes is maintained to produce an aqueous sugar solution of 50 to 65° Brix.

7. Process as claimed in claim 1, wherein the solvent current is passed through a vertical tube having a constriction, to provide a passage with increased flow velocity, which is closed by a sieve, said sieve being corrosion-resistant to the solid material and to the solvent.

8. Process as claimed in claim 7 wherein the rate of inflow of the solvent is controlled by measurement of the flow velocity in the tube and using the resulting signals to regulate the inflow of solvent.

9. Process as claimed in claim 7 wherein the rate of inflow of the solvent is controlled by measurement of the liquid level in the tube and using the resulting signals to regulate the inflow of solvent.

10. Apparatus for the continuous production of solutions having a defined concentration of an easily soluble solute which comprises a vertical tube, a solvent feed line and a solute feed line adapted to feed solvent and solute, respectively, into the top of said tube, a constricted passage within said tube, sieve means closing said constricted passage wherein the surface area of said sieve means is substantially smaller than the cross-sectional area of said tube, and wherein
  (a) said sieve means comprises a plurality of sequential conically constricted passages each of which is closed at the end thereof with sieve means, or
  (b) said constricted passage is formed by an elliptical disc disposed diagonally and contiguously within said tube to make contiguous peripheral contact with the tube, and wherein a minor portion of said elliptical disc comprises sieve means, or
  (c) a plurality of elliptical discs are provided in said tube, each having a minor portion thereof comprised of sieve means.

11. Apparatus as claimed in claim 10 in which a concentration measuring device is disposed in said product take-off line which measuring device is operatively linked to the solute feed line to control the rate of solute feed.

12. Apparatus as claimed in claim 10 wherein said constricted passage is conically constricted in a downwardly direction.

13. Apparatus as claimed in claim 12 wherein there are provided a plurality of sequential conically constricted passages each of which is closed at the end thereof with sieve means.

14. Apparatus for the continuous production of solutions having a defined concentration of an easily soluble solute which comprises a vertical tube, a solvent feed line and a solute feed line adapted to feed solvent and solute, respectively, into the top of said tube, a constricted passage within said tube, sieve means closing said constricted passage wherein the surface area of said sieve means is substantially smaller than the cross-sectional area of said tube, and a product take-off line operatively connected to the sieve means, wherein measurement means are disposed within said tube to measure liquid velocity and said measurement means is operatively linked to the solvent feed line to control the rate of solvent feed.

15. Apparatus for the continuous production of solutions having a defined concentration of an easily soluble solute which comprises a vertical tube, a solvent feed line and a solute feed line adapted to feed solvent and solute, respectively, into the top of said tube, a constricted passage within said tube, sieve means closing said constricted passage wherein the surface area of said sieve means is substantially smaller than the cross-sectional area of said tube, and a product take-off line operatively connected to the sieve means, wherein the solvent feed line is provided with thermostat means capable of maintaining a desired temperature in the solvent feed.

16. Apparatus as claimed in claim 15 wherein thermostat means are disposed within said vertical tube capable of maintained the liquid temperature in the tube at a desired level.

17. Apparatus for the continuous production of solutions having a defined concentration of an easily soluble solute which comprises a vertical tube, a solvent feed line and a solute feed line adapted to feed solvent and solute, respectively, into the top of said tube, a constricted passage within said tube, sieve means closing said constricted passage wherein the surface area of said sieve means is substantially smaller than the cross-sectional area of said tube, and a product take-off line operatively connected to the sieve means, wherein said constricted passage is formed by an elliptical disc disposed diagonally and contiguously within said tube to make contiguous peripheral contact with the tube, and wherein a minor portion of said elliptical disc comprises sieve means.

18. Apparatus as claimed in claim 17 wherein a plurality of elliptical discs are provided in said tube, each having a minor portion thereof comprised of sieve means.

19. Apparatus as claimed in claim 17 wherein successive elliptical discs are disposed in opposite diagonal relationship to each other within said tube.

20. Apparatus for the continuous production of solutions having a defined concentration of an easily soluble solute which comprises a vertical tube, a solvent feed line and a solute feed line adapted to feed solvent and solute, respectively, into the top of said tube, a constricted passage within said tube, sieve means closing said constricted passage wherein the surface area of said sieve means is substantially smaller than the cross-sectional area of said tube, and a product take-off line operatively connected to the sieve means, wherein measurement means are disposed within said tube to measure the liquid level and said measurement means is operatively linked to the solvent feed line to control the rate of solvent feed.

References Cited

UNITED STATES PATENTS

| | | | |
|---|---|---|---|
| 525,970 | 9/1894 | Storer | 23—311 |
| 1,344,102 | 6/1920 | Thorold | 23—311 |
| 2,083,076 | 6/1937 | Mau | 23—311 |
| 3,419,360 | 12/1968 | Rak | 23—311 X |
| 3,539,539 | 11/1970 | Goetzke | 260—78 L |
| 692,020 | 1/1902 | Lambert | 127—22 X |
| 1,138,595 | 5/1915 | Stanton et al. | 23—309 |
| 1,562,863 | 11/1925 | Broadbridge et al. | 23—309 |
| 1,597,911 | 8/1926 | Lomax | 127—22 |
| 1,936,275 | 11/1933 | Siebert | 23—267.2 |
| 2,796,365 | 6/1957 | Thürlings | 127—22 |
| 3,428,487 | 2/1969 | Allen | 127—63 X |

MORRIS O. WOLK, Primary Examiner

S. MARANTZ, Assistant Examiner

U.S. Cl. X.R.

23—267, 309; 127—63

UNITED STATES PATENT OFFICE
CERTIFICATE OF CORRECTION

Patent No. 3,692,579                   Dated September 19, 1972

Inventor(s) Karl Lauer et al

It is certified that error appears in the above-identified patent and that said Letters Patent are hereby corrected as shown below:

Col. 1, head, after inventor listing, please insert the name of the assignee,

-- Boehringer Mannheim GmbH, Postfach, Germany -- .

Col. 3, line 22

For "metal"

Read -- material --

Signed and sealed this 15th day of May 1973.

(SEAL)
Attest:

EDWARD M. FLETCHER, JR.
Attesting Officer

ROBERT GOTTSCHALK
Commissioner of Patents